(12) United States Patent
Takabatake et al.

(10) Patent No.: US 12,537,571 B2
(45) Date of Patent: Jan. 27, 2026

(54) COMMUNICATION RELAY APPARATUS, REMOTE CONTROL APPARATUS, SYSTEM, AREA CONTROL METHOD AND PROGRAM

(71) Applicant: SoftBank Corp., Tokyo (JP)

(72) Inventors: Wataru Takabatake, Tokyo (JP); Yohei Shibata, Tokyo (JP); Kenji Hoshino, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/846,431

(22) PCT Filed: Mar. 9, 2023

(86) PCT No.: PCT/JP2023/009110
§ 371 (c)(1),
(2) Date: May 10, 2025

(87) PCT Pub. No.: WO2023/181967
PCT Pub. Date: Sep. 28, 2023

(65) Prior Publication Data
US 2025/0330217 A1    Oct. 23, 2025

(30) Foreign Application Priority Data
Mar. 24, 2022    (JP) ................................ 2022-049065

(51) Int. Cl.
*H04B 7/06*    (2006.01)
*H04B 7/08*    (2006.01)
(Continued)

(52) U.S. Cl.
CPC .......... *H04B 7/0608* (2013.01); *H04B 7/082* (2013.01); *H04W 16/28* (2013.01); *H04W 64/00* (2013.01)

(58) Field of Classification Search
CPC ........ H04B 7/0608; H04B 7/082; H04B 7/06; H04B 7/08; H04W 16/28; H04W 64/00; H04W 16/24; H04W 84/06; H04W 88/04
See application file for complete search history.

(56) References Cited

U.S. PATENT DOCUMENTS

2017/0324463 A1\* 11/2017 Jalali ................. H04B 7/18502
2018/0069610 A1   3/2018 Alexander et al.
(Continued)

FOREIGN PATENT DOCUMENTS

| JP | 2017-053396 A | 1/2017 |
| JP | 2022-013417 A | 1/2022 |

(Continued)

OTHER PUBLICATIONS

Notice of Reasons for Refusal for Japanese Application No. 2022-049065 (with machine translation), dated Feb. 9, 2023.
(Continued)

*Primary Examiner* — Kenneth T Lam
(74) *Attorney, Agent, or Firm* — Westborough IP Group, LLC

(57) ABSTRACT

It is provided of a communication relay apparatus of aerial-floating type (HAPS) capable of appropriately performing a division into subareas used for an area optimization in dynamic area control that can respond to a change in distribution of terminal apparatuses in a service area configured with plural cells formed toward the ground, depending on a status of the service area. The communication relay apparatus of aerial-floating type (HAPS) estimates positions of plural terminal apparatuses positioned in a service area, divides the service area into plural subareas including plural cells, optimizes plural kinds of antenna parameters of an antenna for service link for each of the subareas, based on an estimation result of positions of plural terminal apparatuses, and applies, to the antenna for service link, optimal
(Continued)

values of the plural kinds of antenna parameters after completing the optimization of each subarea for all of the plural subareas. The service area is divided into plural subareas so that an interdependence between the subareas is reduced.

19 Claims, 15 Drawing Sheets

(51) Int. Cl.
*H04W 16/28* (2009.01)
*H04W 64/00* (2009.01)

(56) References Cited

U.S. PATENT DOCUMENTS

| | | | |
|---|---|---|---|
| 2018/0083671 A1 | 3/2018 | Alexander et al. | |
| 2018/0083672 A1 | 3/2018 | Alexander et al. | |
| 2018/0234284 A1 | 8/2018 | Noerpel et al. | |
| 2022/0086713 A1* | 3/2022 | Määttänen | H04W 36/00837 |
| 2024/0049092 A1* | 2/2024 | Määttänen | H04B 7/18541 |
| 2025/0183993 A1* | 6/2025 | Shibata | H04B 7/18504 |

FOREIGN PATENT DOCUMENTS

| | | | | |
|---|---|---|---|---|
| WO | WO-2016028208 A1 * | 2/2016 | | G01S 5/02521 |
| WO | WO 2022/004728 A1 | 1/2022 | | |

OTHER PUBLICATIONS

Notice of Reasons for Refusal for Japanese Application No. 2022-049065 (with machine translation), dated Apr. 19, 2023.
Decision to Grant Patent for Japanese Application No. 2022-049065 (with machine translation), dated Jun. 29, 2023.
International Search Report and Written Opinion, Dated May 9, 2023.
Notice for Reasons of Refusal, Dated Feb. 9, 2023.
Notice for Reasons of Refusal, Dated Apr. 19, 2023.
Yohei Shibata, et al., System Design of Gigabit HAPS Mobile Communications, IEEEAccess, vol. 8, Aug. 11, 2020.
Yohei Shibata, et al., Dynamic Cell Optimization for HAPS Multi-cell Configuration Considering User Distribution, IEICE Technical Report, IT2020-94, STP2020-72, RCS2020-185, Jan. 2021.
Yohei Shibata, et al., Coevolutionary Dynamic Cell Optimization Algorithm for HAPS Mobile Communications, IEICE Technical Report, RCS2021-131, Oct. 2021.

* cited by examiner

FIG. 2B  AFTER APPLICATION

FIG. 2A  BEFORE APPLICATION

| CELL 1 | | | | CELL 2 | | | | ... | CELL 9 | | | |
|---|---|---|---|---|---|---|---|---|---|---|---|---|
| $\theta_{3dB,1}$ | $\phi_{3dB,1}$ | $\theta_{tilt,1}$ | $\omega_1$ | $\theta_{3dB,2}$ | $\phi_{3dB,2}$ | $\theta_{tilt,2}$ | $\omega_2$ | | $\theta_{3dB,9}$ | $\phi_{3dB,9}$ | $\theta_{tilt,9}$ | $\omega_9$ |

FIG. 5

COMMUNICATION RELAY APPARATUS, REMOTE CONTROL APPARATUS, SYSTEM, AREA CONTROL METHOD AND PROGRAM

TECHNICAL FIELD

The present invention relates to an optimization of a service area configured with cells formed by an aerial-staying type communication relay apparatus toward the ground.

BACKGROUND ART

It is conventionally known a method for performing an area optimization that optimizes an antenna parameter of a service link so that a desired communication quality (for example, throughput) can be obtained in an entire service area (hereinafter, also simply referred to as an "area") formed on the ground by a communication relay apparatus such as a high altitude platform station (HAPS) (also referred to as "high altitude pseudo satellite") that can float and stay in an airspace.

For example, Non-Patent Literature 1 discloses a method for performing an area optimization assuming that the distribution of user equipment (hereinafter also referred to as "UE") as terminal apparatuses in the area is uniform distribution. Non-Patent Literature 2 discloses a method for performing an optimization for each cell so that a desired communication quality (for example, throughput) can be obtained in the entire area in the case that the area is configured with plural cells.

CITATION LIST

Non-Patent Literature

Non-Patent Literature 1: Y. Shibata, N. Kanazawa, M. Konishi, K. Hoshino, Y. Ohta and A. Nagate, "System Design of Gigabit HAPS Mobile Communications," in IEEE Access, vol. 8, pp. 157995-158007, 2020.

Non-Patent Literature 2: Yohei Shibata, Wataru Takahata, Kenji Hoshino, Atsushi Nagate, "HAPS dynamic cell control algorithm considering user distribution in plural cell configuration", IEICE Technical Report, vol. 120, no. 322, RCS2020-185, pp. 170-175, January 2021.

SUMMARY OF INVENTION

Technical Problem

In the method of Non-Patent Literature 2, although the method can be adapted to a non-uniform UE distribution in an area, there is a problem that the calculation for performing an optimization for each cell becomes exponentially more complex, the amount of calculations increases, and the time required for the area optimization increases.

Solution to Problem

A communication relay apparatus according to an aspect of the present invention is a communication relay apparatus of aerial-staying type that has a relay communication station and an antenna for service link for relaying radio communications of terminal apparatuses positioned in plural (N) cells formed toward a service area on a ground. This communication relay apparatus comprises position estimation means for estimating positions of plural terminal apparatuses positioned in the service area, parameter optimization means for dividing the service area into plural (M) subareas including plural cells, and optimizing plural (L) kinds of antenna parameters of the antenna for service link for each of the subareas, based on an estimation result of the positions of the plural terminal apparatuses, parameter application means for applying, to the antenna for service link, optimal values of the plural (L) kinds of antenna parameters after completing the optimization of each subarea for all of the plural (M) subareas. The foregoing parameter optimization means divides the service area into the plural subareas so that an interdependence between the subareas is reduced.

Herein, the foregoing parameter optimization means may optimize the antenna parameters for other subareas other than a main target subarea at a coarser granularity than for the main target subarea, when optimizing the antenna parameters for any one of the plural subareas as the main target subarea.

A communication relay apparatus according to another aspect of the present invention is a communication relay apparatus of aerial-staying type that has a relay communication station and an antenna for service link for relaying radio communications of terminal apparatuses positioned in plural (N) cells formed toward a service area on a ground. This communication relay apparatus comprises position estimation means for estimating positions of plural terminal apparatuses positioned in the service area, parameter optimization means for dividing the service area into plural (M) subareas including plural cells, and optimizing plural (L) kinds of antenna parameters of the antenna for service link for each of the subareas, based on an estimation result of the positions of the plural terminal apparatuses, and parameter application means for applying, to the antenna for service link, optimal values of the plural (L) kinds of antenna parameters after completing the optimization of each subarea for all of the plural (M) subareas. The foregoing parameter optimization means optimizes the antenna parameters for other subareas other than a main target subarea at a coarser granularity than for the main target subarea, when optimizing the antenna parameters for any one of the plural subareas as the main target subarea.

A remote control apparatus according to yet another aspect of the present invention is a remote control apparatus capable of communicating with a communication relay apparatus of aerial-staying type that has a relay communication station and an antenna for service link for relaying radio communications of terminal apparatuses positioned in plural (N) cells formed toward a service area on a ground. This remote control apparatus comprises position estimation means for estimating positions of plural terminal apparatuses positioned in the service area, parameter optimization means for dividing the service area into plural (M) subareas including plural cells, and optimizing plural (L) kinds of antenna parameters of the antenna for service link for each of the subareas, based on an estimation result of the positions of the plural terminal apparatuses, and parameter transmission means for transmitting, to the communication relay apparatus, optimal values of the plural (L) kinds of antenna parameters after completing the optimization of each subarea for all of the plural (M) subareas. The foregoing parameter optimization means divides the service area into the plural subareas so that an interdependence between the subareas is reduced.

Herein, the foregoing parameter optimization means may optimize the antenna parameters for other subareas other than a main target subarea at a coarser granularity than for the main target subarea, when optimizing the antenna parameters for any one of the plural subareas as the main target subarea.

A remote control apparatus according to yet another aspect of the present invention is a remote control apparatus capable of communicating with a communication relay apparatus of aerial-staying type that has a relay communication station and an antenna for service link for relaying radio communications of terminal apparatuses positioned in plural (N) cells formed toward a service area on a ground. This remote control apparatus comprises position estimation means for estimating positions of plural terminal apparatuses positioned in the service area, parameter optimization means for dividing the service area into plural (M) subareas including plural cells and optimizing plural (L) kinds of antenna parameters of the antenna for service link for each of the subareas, based on an estimation result of the positions of the plural terminal apparatuses, and parameter transmission means for transmitting, to the communication relay apparatus, optimal values of the plural (L) kinds of antenna parameters after completing the optimization of each subarea for all of the plural (M) subareas. The foregoing parameter optimization means optimizes the antenna parameters for other subareas other than a main target subarea at a coarser granularity than for the main target subarea, when optimizing the antenna parameters for any one of the plural subareas as the main target subarea.

In the foregoing communication relay apparatus and the foregoing remote control apparatus, the foregoing parameter optimization means may set plural groups respectively configured with plural subarea candidates by rotating the entire plural beams forming the plural cells by a predetermined angle, calculate, for each of the plural groups, an index value of interdependence between the subarea candidates, and determine, as the plural subareas for optimizing the antenna parameters, plural subarea candidates of the group in which total values of the index values of interdependence between the subarea candidates among the plural groups is minimized.

In the foregoing communication relay apparatus and the foregoing remote control apparatus, with respect to the other subareas other than the main target subarea, the foregoing parameter optimization means may determine the granularity when optimizing the antenna parameters, depending on a degree of contribution to an objective function for the entire service area.

Herein, the foregoing objective function may be a communication quality of the entire service area, and the foregoing degree of contribution to the objective function may be a ratio of a number of terminal apparatuses in the other subareas to a number of terminal apparatuses in the entire service area.

In the foregoing communication relay apparatus and the foregoing remote control apparatus, the foregoing parameter optimization means may perform parameter optimization for each subarea using a genetic algorithm.

In the foregoing communication relay apparatus and the foregoing remote control apparatus, the foregoing parameter optimization means may repeatedly perform the parameter optimization for each subarea plural times (T times).

In the foregoing communication relay apparatus and the foregoing remote control apparatus, the foregoing position estimation of the plural terminal apparatuses, the foregoing optimization of the antenna parameters and the foregoing application of the optimal values of the antenna parameters to the antenna for service link may be performed periodically or when an amount of change in distribution of the terminal apparatuses in the service area becomes larger than a predetermined amount of change.

In the foregoing communication relay apparatus, the foregoing relay communication station may be connected to a mobile communication network via a feeder link with a gateway station on the ground, and may comprise a base-station processing section for performing a baseband processing.

In the foregoing communication relay apparatus, the foregoing relay communication station may comprise a repeater section that is connected to the base station apparatus via a feeder link with a gateway station on the ground and performs a radio relaying.

A system according to yet another aspect of the present invention comprises any one of the foregoing remote control apparatuses, and a communication relay apparatus of aerial-staying type that has a relay communication station and an antenna for service link for relaying radio communications of terminal apparatuses positioned in plural (N) cells formed toward a service area on the ground.

A method according to yet another aspect of the present invention is an area control method for a service area configured with plural (N) cells formed from a communication relay apparatus of aerial-staying type toward a ground. This area control method includes estimating positions of plural terminal apparatuses positioned in the service area, dividing the service area into plural (M) subareas including plural cells, and optimizing plural (L) kinds of antenna parameters of an antenna for service link for each of the subareas, based on an estimation result of the positions of the plural terminal apparatuses, applying, to the antenna for service link, optimal values of the plural (L) kinds of antenna parameters after completing the optimization of each subarea for all of the plural (M) subareas, and dividing the service area into the plural subareas so that an interdependence between the subareas is reduced.

Herein, with respect to other subareas other than a main target subarea, the antenna parameters may be optimized at a coarser granularity than for the main target subarea, when optimizing the antenna parameters for any one of the plural subareas as the main target subarea.

A method according to yet another aspect of the present invention is an area control method for a service area configured with plural (N) cells formed from a communication relay apparatus of aerial-staying type toward a ground. This area control method includes estimating positions of plural terminal apparatuses positioned in the service area, dividing the service area into plural (M) subareas including plural cells, and optimizing plural (L) kinds of antenna parameters of an antenna for service link for each of the subareas, based on an estimation result of the positions of the plural terminal apparatuses, applying, to the antenna for service link, optimal values of the plural (L) kinds of antenna parameters after completing the optimization of each subarea for all of the plural (M) subareas, and optimizing the antenna parameters for other subareas other than a main target subarea at a coarser granularity than for the main target subarea, when optimizing the antenna parameters for any one of the plural subareas as the main target subarea.

A program according to yet another aspect of the present invention is a program executed by a computer or processor provided in a communication relay apparatus of aerial-staying type that has a relay communication station and an antenna for service link for relaying radio communications of terminal apparatuses positioned in plural (N) cells formed toward a service area on a ground. This program includes a program code for estimating positions of plural terminal apparatuses positioned in the service area, a program code for dividing the service area into plural (M) subareas including plural cells, and optimizing plural (L) kinds of antenna parameters of the antenna for service link for each of the subareas, based on an estimation result of the positions of the plural terminal apparatuses, a program code for applying, to the antenna for service link, optimal values of the plural (L) kinds of antenna parameters after completing the optimization of each subarea for all of the plural (M) subareas, and a program code for dividing the service area into the plural subareas so that an interdependence between the subareas is reduced.

Herein, the program may include a program code for optimizing the antenna parameters for other subareas other than a main target subarea at a coarser granularity than for the main target subarea, when optimizing the antenna parameters for any one of the plural subareas as the main target subarea.

A program according to yet another aspect of the present invention is a program executed by a computer or processor provided in a communication relay apparatus of aerial-staying type that has a relay communication station and an antenna for service link for relaying radio communications of terminal apparatuses positioned in plural (N) cells formed toward a service area on a ground. This program includes a program code for estimating positions of plural terminal apparatuses positioned in the service area, a program code for dividing the service area into plural (M) subareas including plural cells, and optimizing plural (L) kinds of antenna parameters of the antenna for service link for each of the subareas, based on an estimation result of the positions of the plural terminal apparatuses, a program code for applying, to the antenna for service link, optimal values of the plural (L) kinds of antenna parameters after completing the optimization of each subarea for all of the plural (M) subareas, and a program code for optimizing the antenna parameters for other subareas other than a main target subarea at a coarser granularity than for the main target subarea, when optimizing the antenna parameters for any one of the plural subareas as the main target subarea.

A program according to yet another aspect of the present invention is a program executed by a computer or processor provided in a remote control apparatus capable of communicating with a communication relay apparatus of aerial-staying type that has a relay communication station and an antenna for service link for relaying radio communications of terminal apparatuses positioned in plural (N) cells formed toward a service area on a ground. This program includes a program code for estimating positions of plural terminal apparatuses positioned in the service area, a program code for dividing the service area into plural (M) subareas including plural cells, and optimizing plural (L) kinds of antenna parameters of the antenna for service link for each of the subareas, based on an estimation result of the positions of the plural terminal apparatuses, a program code for transmitting, to the communication relay apparatus, optimal values of the plural (L) kinds of antenna parameters after completing the optimization of each subarea for all of the plural (M) subareas, and a program code for dividing the service area into the plural subareas so that an interdependence between the subareas is reduced.

Herein, the program may include a program code for optimizing the antenna parameters for other subareas other than a main target subarea at a coarser granularity than for the main target subarea, when optimizing the antenna parameters for any one of the plural subareas as the main target subarea.

A program according to yet another aspect of the present invention is a program executed by a computer or processor provided in a remote control apparatus capable of communicating with a communication relay apparatus of aerial-staying type that has a relay communication station and an antenna for service link for relaying radio communications of terminal apparatuses positioned in plural (N) cells formed toward a service area on a ground. This program includes a program code for estimating positions of plural terminal apparatuses positioned in the service area, a program code for dividing the service area into plural (M) subareas including plural cells, and optimizing plural (L) kinds of antenna parameters of the antenna for service link for each of the subareas, based on an estimation result of the positions of the plural terminal apparatuses, a program code for transmitting, to the communication relay apparatus, optimal values of the plural (L) kinds of antenna parameters after completing the optimization of each subarea for all of the plural (M) subareas, and a program code for optimizing the antenna parameters for other subareas other than a main target subarea at a coarser granularity than for the main target subarea, when optimizing the antenna parameters for any one of the plural subareas as the main target subarea.

All or part of the foregoing program may include a learned model created by a machine learning.

Advantageous Effects of Invention

According to the present invention, it is possible to perform a dynamic area control that can respond to a change in a distribution of terminal apparatuses in a service area configured with plural cells formed from the communication relay apparatus of aerial-floating type toward the ground, and appropriately perform a division of subareas used for area optimization in the dynamic area control depending on a status of the service area.

BRIEF DESCRIPTION OF DRAWINGS

FIG. 5 is an illustration showing a list of antenna parameters to be targeted for the optimization applied to each cell.

DESCRIPTION OF EMBODIMENTS

Hereinafter, embodiments of the present invention are described with reference to the drawings.

A system according to the embodiment described herein is a dynamic-area control system capable of responding to a change in user distribution while suppressing an increase in an area-optimization time by estimating a position of user's UE (terminal apparatus) in a target area where a HAPS relays communications, dividing an entire area into plural subareas, sequentially selecting subareas, and optimizing antenna parameters in the selected subarea based on the estimated UE position information in a HAPS mobile communication system configured with plural cells.

In particular, the system according to the embodiment performs the divisions to the subareas as appropriate to reduce an interdependence between the subareas, and when optimizing antenna parameters for a main target subarea, the system optimizes antenna parameters for other subareas other than the main target subarea at a coarser granularity than for the main target subarea. As a result, it is possible to appropriately perform the division to the subareas used for an area optimization in a dynamic area control and adjust an setting of antenna parameters in each subarea at appropriate granularity depending on the status of the service area.

Figure 1:
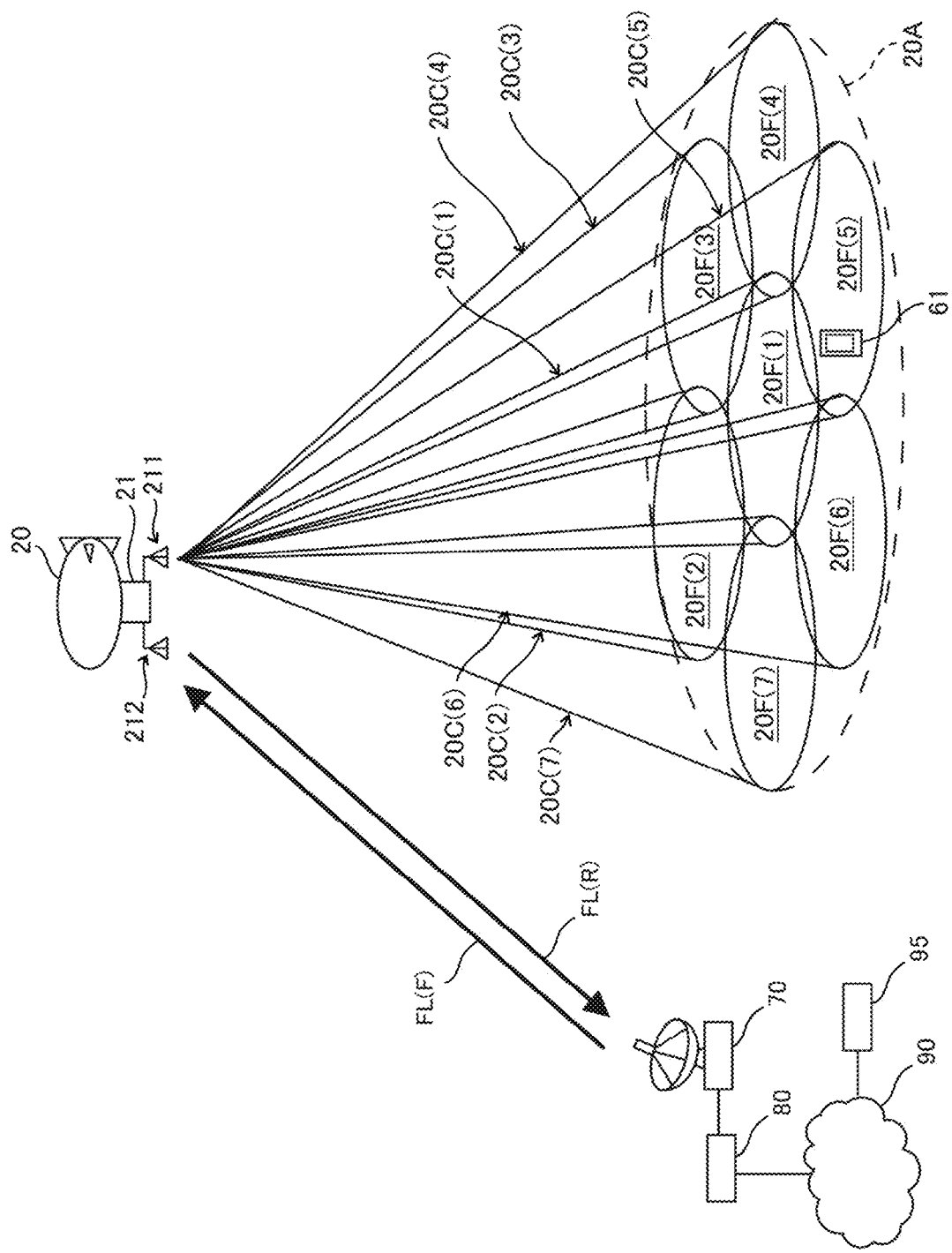
FIG. 1 is an illustration showing an example of a configuration of a communication system according to an embodiment.

FIG. 1 is an illustration showing an example of a configuration of a communication system according to an embodiment of the present invention. The communication system according to the present embodiment is suitable for realizing a 3D network of mobile communication of the 5th generation or later generation that supports simultaneous connections to a large number of terminal apparatuses (hereinafter referred to as "UE") and low latency, etc. The mobile communication standards applicable to the communication system, radio relay station, base station, repeater and UE disclosed in the present description include the 5th generation mobile communication standard and the next generation mobile communication standard after the 5th generation.

As shown in FIG. 1, the communication system is provided with a High-Altitude Platform Station (HAPS) (also referred to as a "high altitude pseudo satellite" or "stratospheric platform") 20 as an aerial-floating type communication relay apparatus (radio relay apparatus). The HAPS 20 is located in an airspace at a predetermined altitude and forms a three-dimensional cell (three-dimensional area) in a cell-formation target airspace at a predetermined altitude. The HAPS 20 is an airship as a floating object that is controlled by an autonomous control or an external control so as to float or fly and be located in a high-altitude airspace (floating airspace) less than 100 [km] from the ground level or the sea level, and has a relay communication station 21 mounted thereon.

The airspace where the HAPS 20 is located is, for example, a stratospheric airspace at an altitude of 11 [km] or more and 50 [km] or less above the ground (or, above the water such as the sea or lake). This airspace may be an airspace at an altitude of 15 [km] or more and 25 [km] or less where weather conditions are relatively stable, and may be an airspace at an altitude of about 20 [km] in particular.

A cell-formation target airspace, where is a target airspace in which one or more HAPS form a three-dimensional cell in the communication system of the present embodiment, is an airspace within a predetermined altitude range (for example, an altitude range of 50 [m] or more and 1000 [m] or less) located between the airspace where the HAPS 20 is located and the cell formation area near the ground covered by the base station such as a conventional macro-cell base station or the like (for example, the LTE eNodeB or the next-generation gNodeB).

It is noted that the cell-formation target airspace, in which the three-dimensional cell of the present embodiment is formed, may be an upper airspace on the sea, a river, or a lake. Further, the three-dimensional cell formed by the HAPS 20 may be formed so as to reach the ground level or the sea level so that the communication can be performed with the UE 61 located on the ground or on the sea.

The relay communication station 21 of the HAPS 20 forms plural beams toward the ground level for performing a radio communication with the mobile station UE 61 that is a mobile station by an antenna for service link (hereinafter referred to as "SL antenna") 211. The SL antenna 211 is, for example, a single or plural array antennas in which plural antenna elements are disposed two-dimensionally or three-dimensionally, and can form plural beams toward the ground.

The UE 61 may be a communication terminal module built into a drone that is an aircraft such as a small helicopter capable of being remotely controlled, or may be a user apparatus used by a user in an airplane. The area through which the beam passes in the cell-formation target airspace is a three-dimensional cell. Plural beams adjacent to each other in the cell-formation target airspace may partially overlap.

The relay communication station 21 of the HAPS 20 is, for example, a base station that wirelessly communicates with a gateway station (also referred to as a "feeder station") 70 as a relay station connected to a core network on the ground (or on the sea) side, or a slave repeater that wirelessly communicates with the feeder station (master repeater) 70 as a relay station connected to a base station apparatus on the ground (or on the sea) side. It is noted that, in the following embodiment, it is described of a case in which the relay communication station 21 is a slave repeater.

The relay communication station 21 of the HAPS 20 is connected to a core network of a mobile communication network 90 via the gateway station (hereinafter referred to as "GW station") 70 installed on the ground or on the sea capable of performing a wireless communication using an antenna for feeder link (hereinafter referred to as "FL antenna") 212 and a base station apparatus 80, and further connected to the Internet which is an external communication network. The FL antenna 212 may be, for example, a single or plural array antennas in which plural antenna elements are disposed two-dimensionally or three-dimensionally. The feeder link FL(F) in the figure is a forward link from the GW station 70 toward the UE 61 via the HAPS 20, and the feeder link FL(R) is a reverse link from the UE 61 toward the GW station 70 via the HAPS 20.

The HAPS 20 may autonomously control its own floating movement (flight) and process in the relay communication station by executing a control program by a control section configured with a computer or processor incorporated inside or the like. For example, the HAPS 20 can autonomously perform a dynamic area control described later. The HAPS 20 may obtain its own current position information (for example, GPS position information), position-control information (for example, flight schedule information) stored in advance, position information on another HAPS located in a peripheral space, or the like, and may autonomously control a floating movement (flight) and process in the relay communication station 21 based on these kinds of information.

The control section of the HAPS 20 also functions as means for the following C1 to C5 by executing a control program.

C1. Position estimation means for estimating positions of plural UEs 61 positioned in a service area 20A.

C2. Parameter optimization means for dividing the service area 20A into plural (M) subareas 20S including plural cells 20C and optimizing plural (L) types of antenna parameters of the SL antenna 211, based on an estimation result of the positions of the plural UEs 61 for each subarea 20S.

C3. Parameter application means for applying to the SL antenna 211 the optimal values of the plural (L) types of antenna parameters after completing the optimization of each subarea 20S for all of the plural (M) subareas 20S.

C4. Means for dividing the service area 20A into plural subareas 20S so that an interdependence between the subareas 20S is reduced in the foregoing parameter optimization means.

C5. Means for optimizing antenna parameters at a coarser granularity than the main target subarea for other subareas other than the main target subarea when optimizing antenna parameters for any one of the plural subareas 20S as the main target subarea in the foregoing parameter optimization means.

Herein, the positions of the plural UEs 61 can be estimated using, for example, GNSS position information or MR (measurement report) fed back from each UE 61.

The floating movement (flight) of the HAPS 20 and the process in the relay communication station 21 may be controlled by a remote control apparatus 95 provided in a communication center of the mobile communication network 90 or the like. The remote control apparatus 95 can be configured with, for example, a computer apparatus such as a PC, a server, or the like. The HAPS 20 may incorporate a communication terminal apparatus for control (for example, a mobile communication module) so that it can receive control information from the remote control apparatus 95 and transmit various kinds of information such as monitoring information to the remote control apparatus 95, and may be assigned terminal identification information (for example, IP address, telephone number, etc.) so that it can be identified from the remote control apparatus 95. The MAC address of the communication interface may be used to identify the communication terminal apparatus for control.

The remote control apparatus 95 is capable of performing a dynamic area control described later, for example, by cooperating with the HAPS 20.

The HAPS 20 may transmit information regarding the floating movement (flight) of the own HAPS or a surrounding HAPS and the process in the relay communication station 21, position information on the HAPS 20, and monitoring information such as information regarding a status of the HAPS 20 and observation data obtained by various kinds of sensors, to a predetermined transmission destination such as the remote control apparatus 95, etc. The control information may include target-flight route information of the HAPS. The monitoring information may include at least one of information on current position, flight-route history information, a velocity relative to the air, a velocity relative to the ground and a propulsion direction of the HAPS 20, a wind velocity and a wind direction around the HAPS 20, and an atmospheric pressure and a temperature around the HAPS 20.

Duplex methods of uplink and downlink for radio communication with the relay communication station 21 and the UE 61 are not limited to specific methods, and may be, for example, a time division duplex method (Time Division Duplex: TDD) or a frequency division duplex method (Frequency Division Duplex: FDD). An access method for radio communication with the relay communication station 21 and the UE 61 is not limited to the specific method, but may be, for example, an FDMA (Frequency Division Multiple Access) method, TDMA (Time Division Multiple Access) method, CDMA (Code Division Multiple Access) method, or OFDMA (Orthogonal Frequency Division Multiple Access). A MIMO (Multi-Input and Multi-Output) technology may be used for the wireless communication, wherein the MIMO technology has functions such as a diversity coding, a transmission beamforming, and a spatial division multiplexing (SDM: Spatial Division Multiplexing), and can increase a transmission capacity per unit frequency by simultaneously using plural antennas for both transmission and reception. The MIMO technology may be SU-MIMO (Single-User MIMO) technology in which one base station transmits plural signals at the same time and on the same frequency to one UE, or may be MU-MIMO (Multi-User MIMO) technology in which one base station transmits signals to plural different UEs at the same time and frequency, or plural different base stations transmit signals to one UE at the same time and frequency.

It is noted that in the following embodiments, although it is illustrated and described of a case in which the communication relay apparatus having the relay communication station 21 that wirelessly communicates with the UE 61 is an unmanned-airship type HAPS 20, the communication relay apparatus may be a solar plane, a drone (unmanned aerial vehicle) or another type of flying object in which the relay communication station 21 is mounted. Further, the following embodiments can be similarly applied to other aerial-floating type communication relay apparatuses other than the HAPS.

In the HAPS mobile communication system having the above configuration, for example, a signal from the base station apparatus 80 is relayed by the GW station 70 and the HAPS 20, and a communication service can be provided to the UE 61 on the ground. In the present communication system, an area optimization is performed to optimize the antenna parameters of the SL antenna 211 so that a desired communication quality (for example, throughput) can be obtained throughout the service area (hereinafter also simply referred to as "area") 20A configured with plural cells 20C(1) to 20C(7) formed by the HAPS 20 toward the ground.

The area (HAPS coverage area) is a very wide area, and the distribution of UEs (user distribution) is not uniform and varies depending on location and time. For example, the geographical distribution due to UE (user) movements changes depending on the time of day (day, night, etc.). In the event of a large-scale disaster, there is a possibility that a sudden increase in traffic (traffic demand different from normal times) may occur due to a concentration of UEs in a part of the area. In order to dynamically response to such a non-uniform UE distribution in an area that changes depending on location and time, a dynamic area control is performed to dynamically perform the area optimization for each cell configuring the area 20A in the present embodiment.

Figure 2:
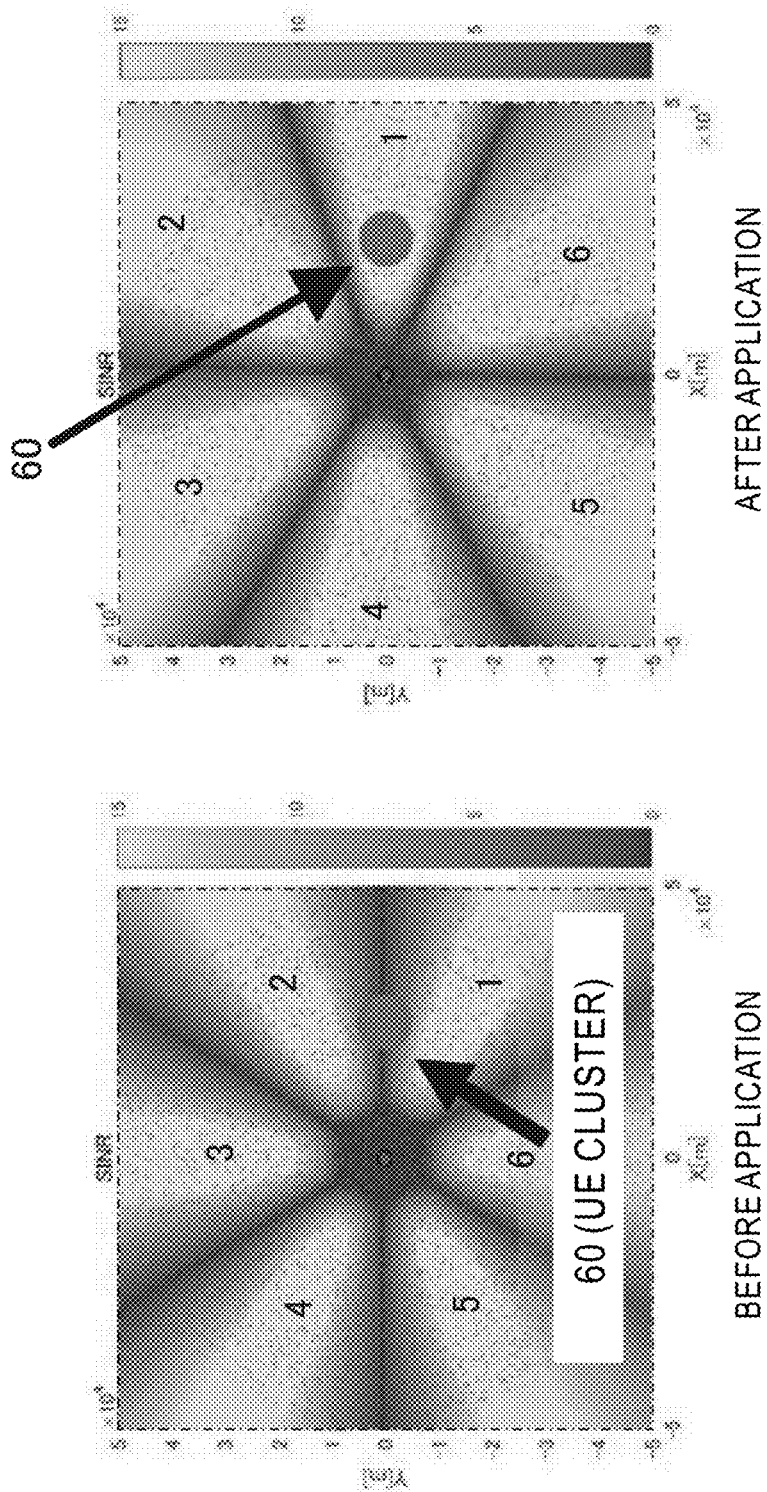
FIG. 2A is an illustration of a cell arrangement before applying an area optimization for each cell in a service area configured with six cells.
FIG. 2B is an illustration of a cell arrangement after applying an area optimization for each cell in a service area configured with six cells.

Each of FIG. 2A and FIG. 2B is an illustration of cell arrangement before and after applying the area optimization in a service area configured with six cells. The six portions with high brightness in FIGS. 2A and 2B are the cell positions, and the numeric characters in these portions are numbers for identifying the cells. In FIGS. 2A and 2B, the positions of the UEs in the area are indicated by small dots. In the example of FIGS. 2A and 2B, a UE-high density portion (hereinafter referred to as a "UE cluster") 60 occurs where the density of UEs is partially high at one portion in the area. Although the UE cluster 60 indicated by the arrow in the figure does not correspond to a cell before applying the area optimization in FIG. 2A, the UE cluster (UE-high density portion) 60 corresponds to the cell 1 formed with priority given to the beam direction after applying the area optimization in FIG. 2B. In addition, an interference between UEs (users) is suppressed by the area optimization.

By performing the area optimization for each cell in this way, the cell position (beam direction) can be made to correspond to the non-uniform UE distribution in the area. However, in the case of performing the area optimization in which plural antenna parameters of the SL antenna 211 are optimized for each cell, since the number of cells in the area and the number of antenna parameters increases and the calculations for optimizing the antenna parameters for each cell become exponentially more complex, the amount of calculations increases and the time required for area optimization increases.

For example, in an area optimization of an area configured with N cells, the following four types of antenna parameters A to D are defined and used as plural (L) types of antenna parameters for any i-th cell i in the area.

Figure 3:
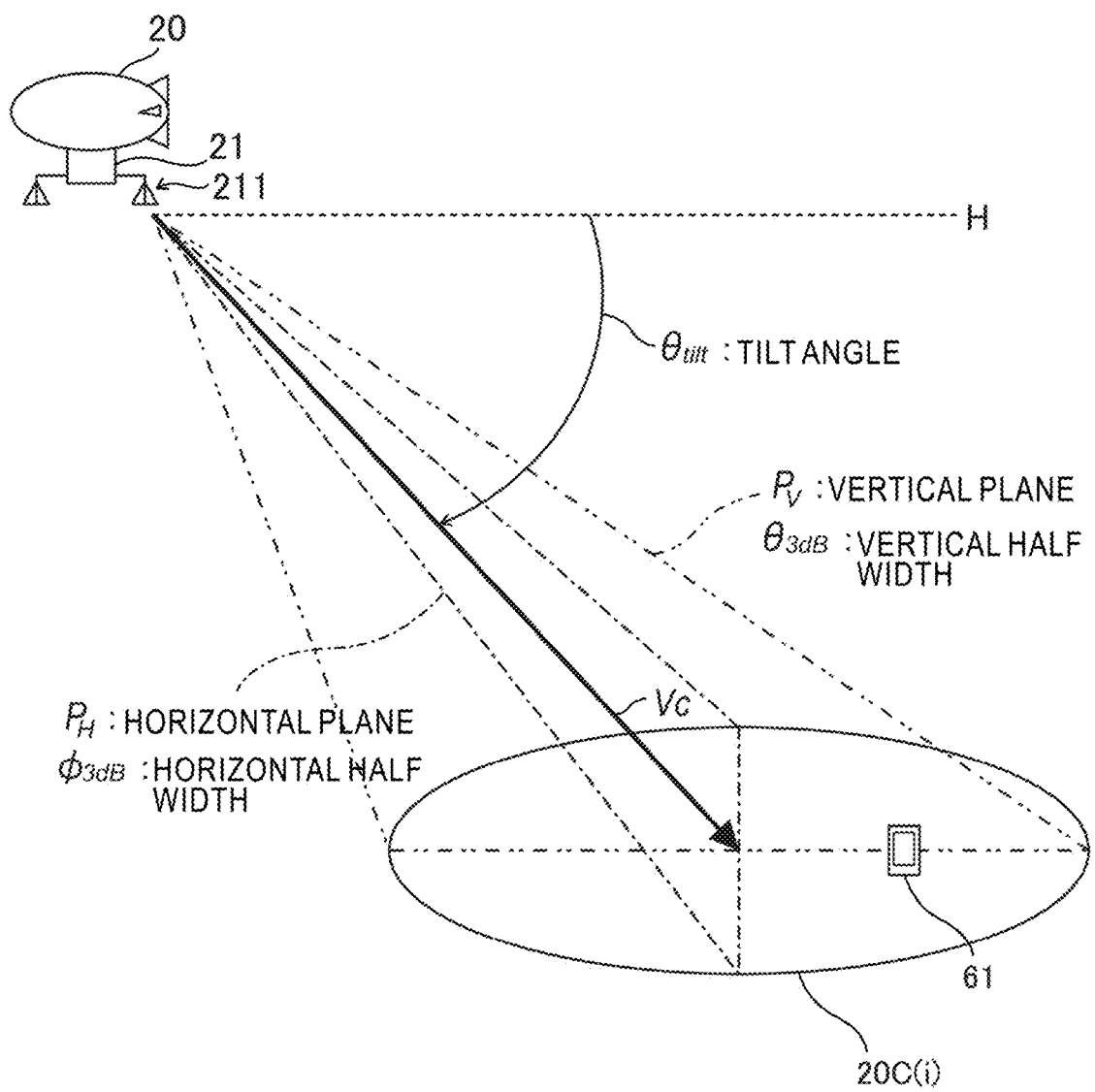
FIG. 3 is an illustration of antenna tilt angle, vertical half-width and horizontal half-width as antenna parameters used for an area optimization.

A. Tilt angle $\theta_{tilt,i}$
B. Vertical half width $\theta_{3dB,i}$
C. Horizontal half width $\varphi_{3dB,i}$
D. Horizontal pointing direction $\omega_i$ of cell As shown in FIG. 3, the tilt angle $\theta_{tilt,i}$ is an angle from the horizontal direction H of the vector Vc from the SL antenna 211 of the HAPS 20 toward the center of the target i-th cell 20C(i). The vertical half-width $\theta_{3dB,i}$ is an angular width between two points where the beam gain is decreased by 3 dB from the maximum gain at the center of the main beam in the vertical plane Pv including the vector Vc toward the center of the i-th cell 20C(i). The horizontal half-value width $\varphi_{3dB,i}$ is an angular width between two points where the beam gain is decreased by 3 dB from the maximum gain at the center of the main beam in the horizontal plane $P_H$ including the vector Vc toward the center of the i-th cell 20C(i).

Figure 4:
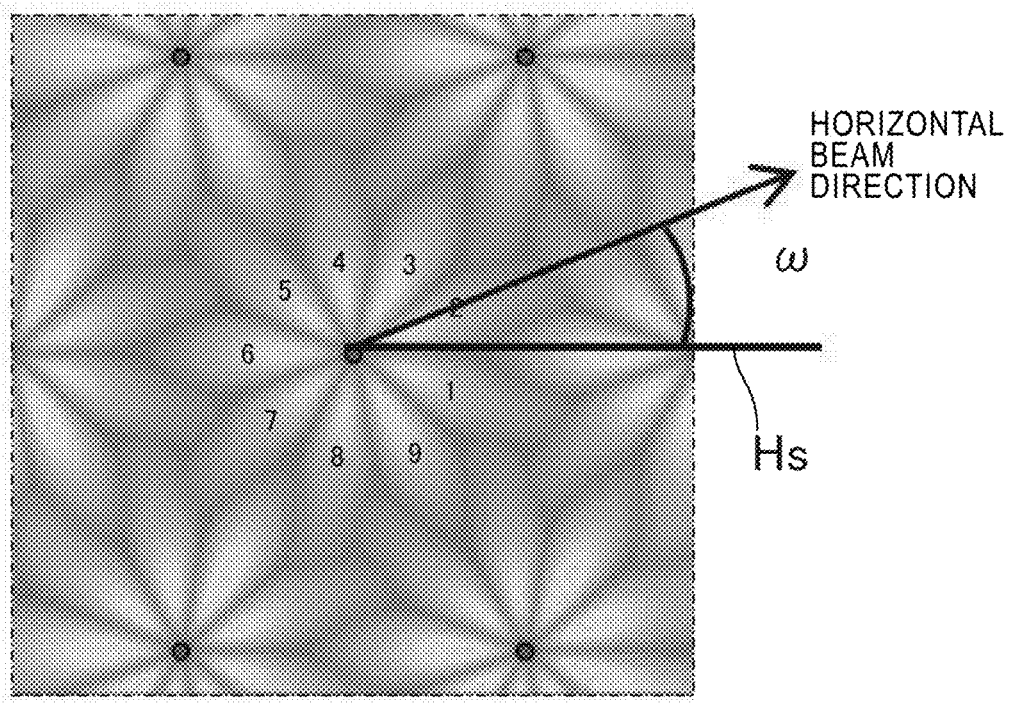
FIG. 4 is an illustration of a horizontal pointing direction for subareas used for an area optimization.

As shown in FIG. 4, the horizontal pointing direction Oi of the i-th cell is an angle in a direction from the reference point passing through the center of the target cell (cell 2 in the illustrated example) with respect to a predetermined reference horizontal direction Hs, in a horizontal plane including the position of the SL antenna 211 of the HAPS 20 (in the illustrated example, the center of the area 20A with the radius R) as a reference point.

In the case of four types of antenna parameters A to D, if the number of cells is N, the total number of antenna parameters to be targeted for optimization is 4N. For example, in the case that the number of cells is nine, the total number of antenna parameters to be targeted for optimization is 36 as shown in FIG. 5. Assuming that the number of candidates for each antenna parameter is 10, the number of combinations of the candidates of antenna parameters to be targeted for optimization is $10^{4N}$. In this way, the number of combinations of the candidates of antenna parameters to be targeted for optimization increases exponentially as the number N of cells increases, and the calculation for performing the optimization for each cell becomes exponentially more complex. Therefore, the amount of calculation for the area optimization increases, and the time required for the area optimization increases. In the case of other cells, calculations for optimizing the antenna parameters may not be completed within real time.

In the present embodiment, the service area 20A is divided into plural (M) subareas including plural cells, and plural (L) types (four types in the above example) of antenna parameters are optimized for each subarea.

Figure 6:
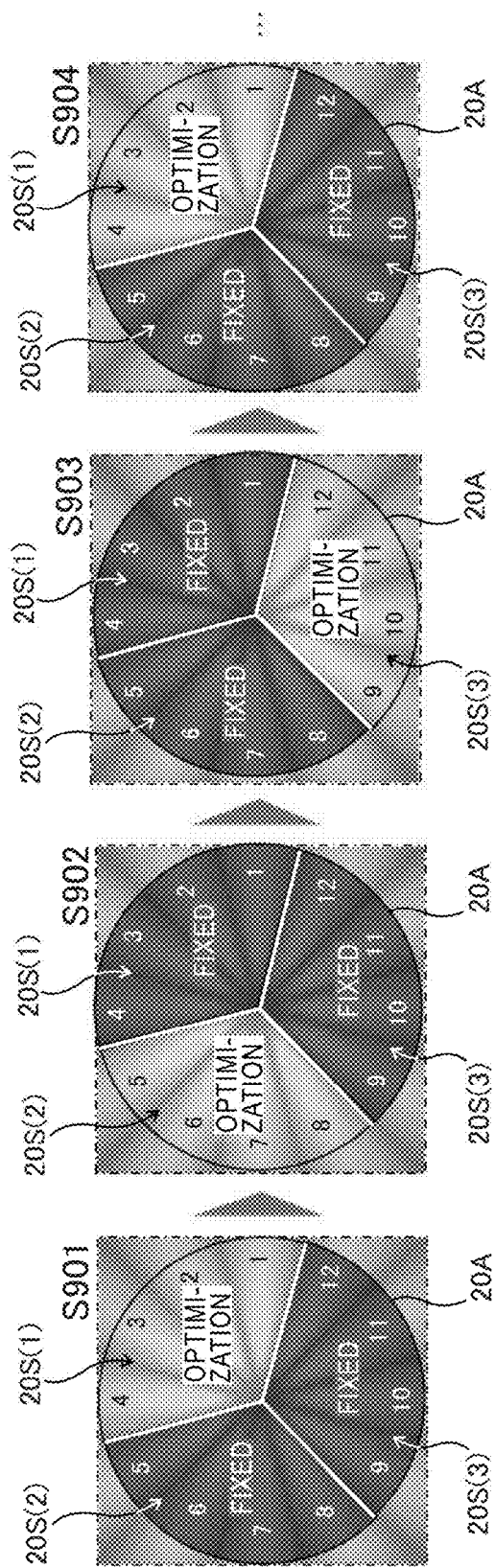
FIG. 6 is an illustration showing a procedure for dividing a service area into plural subareas and optimizing antenna parameters for each subarea in a communication system according to a comparative example.
Figure 7A:
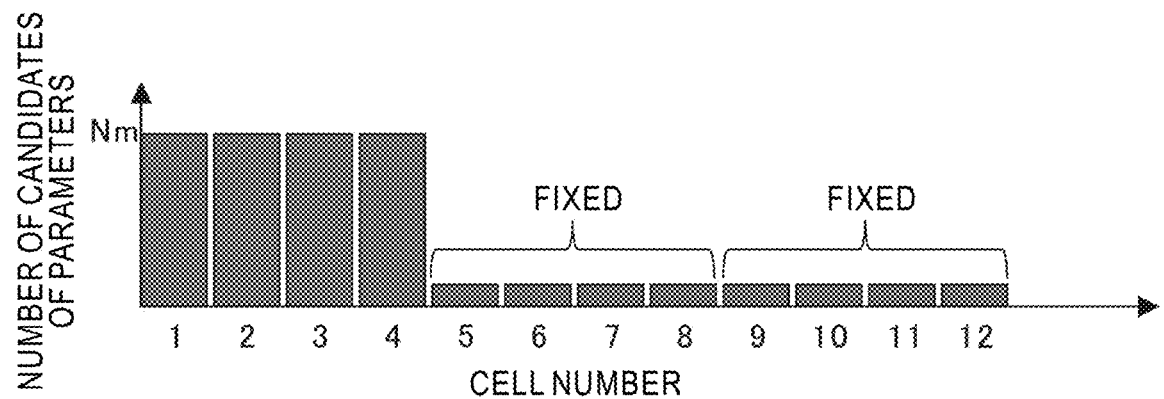
FIG. 7A is an illustration showing an example of the number of candidates to be set as setting values of parameters for each cell when optimizing each of the plural subareas in FIG. 6.
Figure 7B:
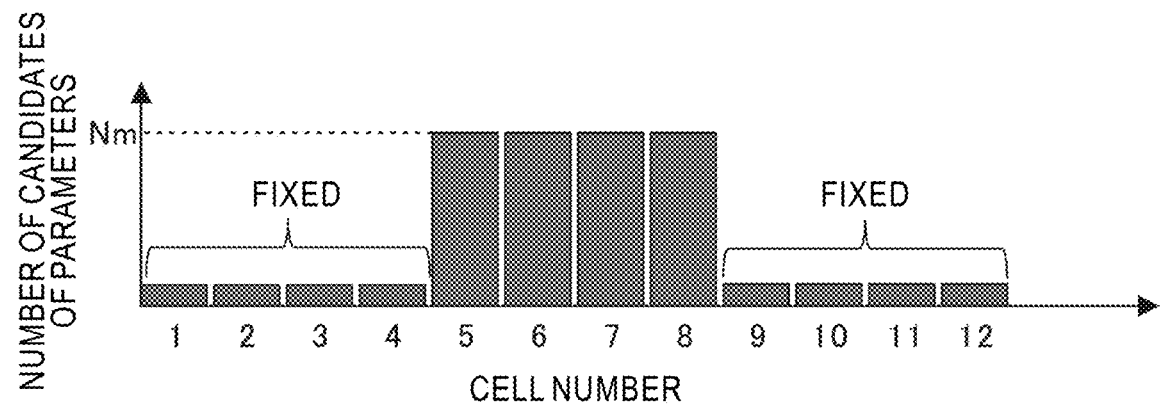
FIG. 7B is an illustration showing an example of the number of candidates to be set as setting values of parameters for each cell when optimizing each of the plural subareas in FIG. 6.
Figure 7C:
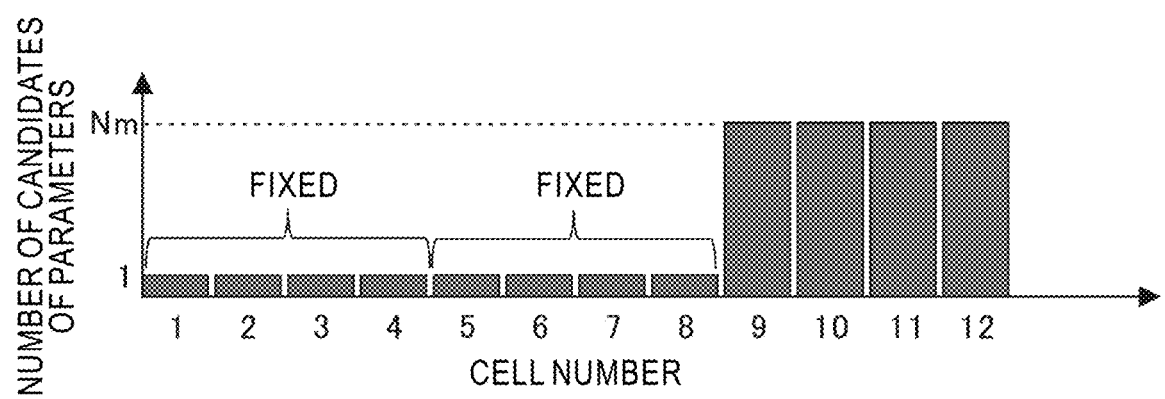
FIG. 7C is an illustration showing an example of the number of candidates to be set as setting values of parameters for each cell when optimizing each of the plural subareas in FIG. 6.

FIG. 6 is an illustration showing a procedure (S901 to S904) for dividing the service area 20A into plural subareas and optimizing an antenna parameter for each subarea in a communication system according to a comparative example. Each of FIGS. 7A, 7B and 7C is an illustration showing an example of the number of candidates to be set as setting values of parameters for each cell when optimizing each of the plural subareas in FIG. 6. In the comparative example, the area 20A is divided into plural subareas (for example, three subareas) in a predetermined division manner as shown in FIG. 6. Since the total number of cells N is 12, in the case that the number M of subareas 20S(1) to 20S(3) divided from the area 20A is 3, each subarea is configured with 4 (=N/M) cells. It is noted that, in FIG. 6, the high brightness portions are cells, and the numeric character in the cell indicates an identification number (cell number) of the cell (the same also in FIG. 8, FIG. 11 and FIG. 12 described later).

In the comparative example of FIG. 6, for example, the number of antenna parameters in each subarea is 16 (which is the number of antenna parameters per cell multiplied by the number of cells), and using a predetermined control algorithm (for example, a co-evolutionary dynamic cell control algorithm), the antenna parameters are fixed in the areas other than the target subarea, and the antenna parameters of the target subarea are sequentially optimized.

For example, when optimizing the setting values of the antenna parameters within a range of a predetermined number Nm (for example, 10) of candidates for the subarea 20S(1) including the cells 1 to 4 as the target subarea (S901), the setting values of the antenna parameters for the remaining other subareas 20S(2) and 20S(3) are fixed (see FIG. 7A).

Similarly, when optimizing the setting values of the antenna parameters within a range of a predetermined number Nm (for example, 10) of candidates for the subarea 20S(2) including the cells 5 to 8 as the target subarea (S902), the setting values of the antenna parameters for the remaining other subareas 20S(1) and 20S(3) are fixed (see FIG. 7B). Further, when optimizing the setting values of the antenna parameters within a range of a predetermined number Nm (for example, 10) of candidates for the subarea 20S(3) including the cells 9 to 12 as the target subarea (S903), the setting values of the antenna parameters for the remaining other subareas 20S(1) and 20S(2) are fixed (see FIG. 7C).

In the case that the area 20A is divided into three subareas 20S(1) to 20S(3) as in the comparative example, each subarea includes 16 kinds of antenna parameters. That is, the number of antenna parameters to be optimized at one time can be reduced from 4N for the entire area 20A to 4(N/M)+M−1 for each subarea. Therefore, the amount of calculation for optimization per one time can be significantly reduced.

However, in the comparative example, since the division manner of the area 20A into the subareas 20S(1) to 20S(3) is fixed, in the case that the interdependence between the subareas after dividing is large, the communication quality and characteristics of the area 20A may deteriorate even if the antenna parameters are optimized.

If the setting values of the antenna parameters of the other subareas other than the target subarea are fixed when optimizing the antenna parameters of the target subarea, in the case that the interdependence between the target subarea and other subareas is large, the optimization of the antenna parameters of the target subarea (adjustment of the beam to each cell) is difficult.

Therefore, in the present embodiment, rather than fixing the division manner of the subareas from the beginning, the division manner of the subareas is set appropriately so that the interdependence between the subareas is reduced. Further, when sequentially optimizing the antenna parameters of the target subarea, rather than fixing the setting values of the antenna parameters of the other subareas, the setting values of the antenna parameters are optimized by coarsening the adjustment granularity depending on the degree of contribution to the objective function.

Figure 8:
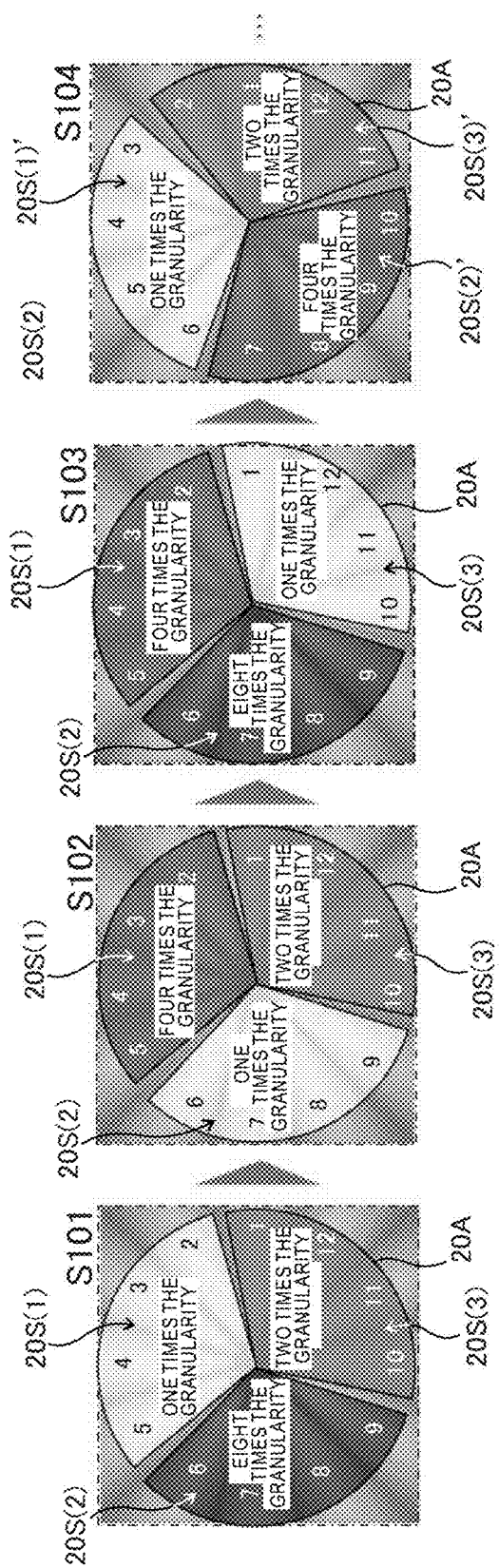
FIG. 8 is an illustration showing an example of an area division in which a service area is divided into plural subareas in the communication system according to the embodiment.
Figure 9A:
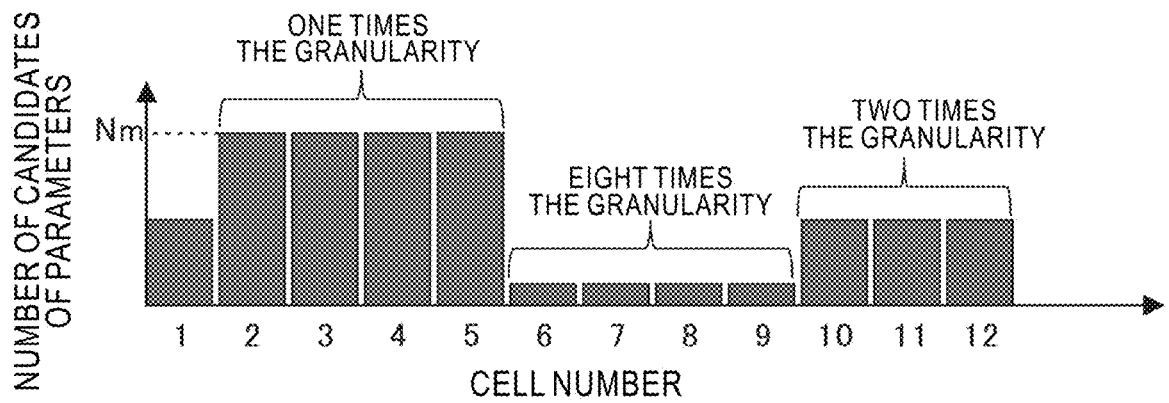
FIG. 9A is an illustration showing an example of the number of candidates to be set as setting values of parameters for each cell when optimizing each of the plural subareas in FIG. 8.
Figure 9B:
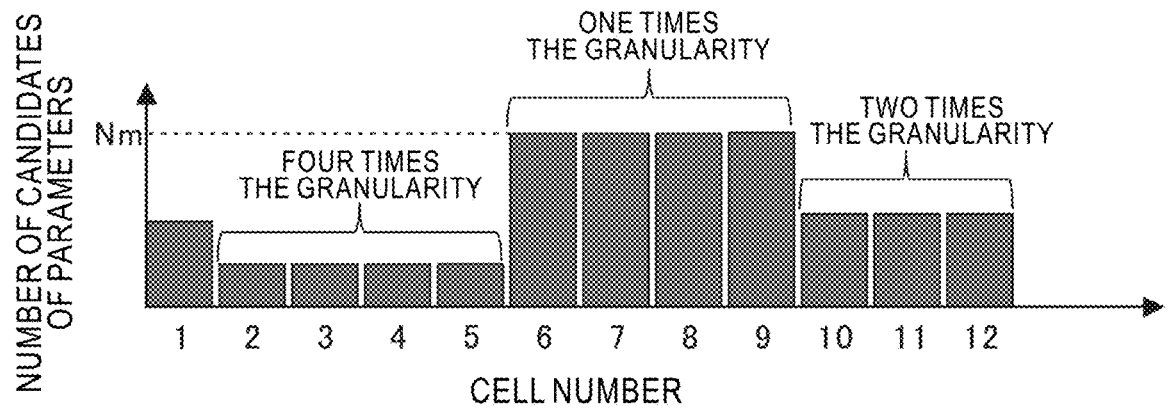
FIG. 9B is an illustration showing an example of the number of candidates to be set as setting values of parameters for each cell when optimizing each of the plural subareas in FIG. 8.
Figure 9C:
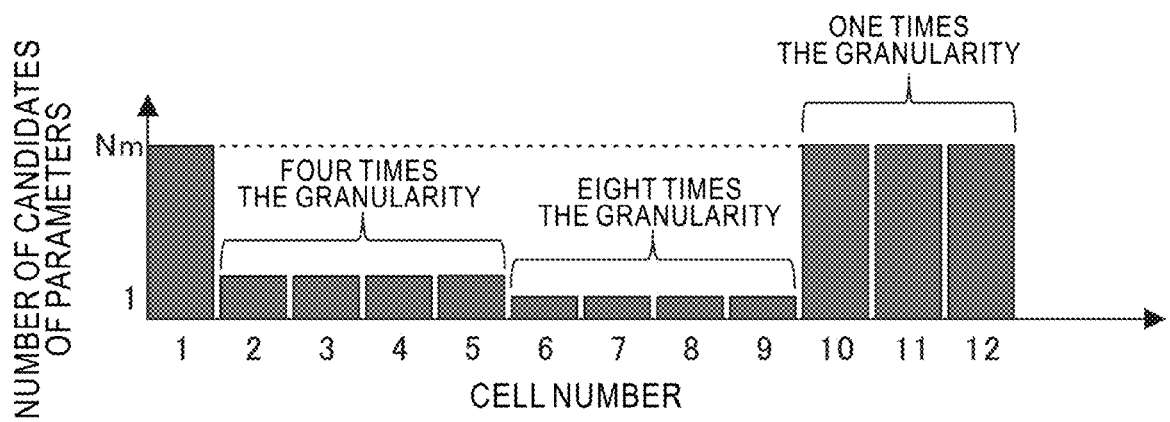
FIG. 9C is an illustration showing an example of the number of candidates to be set as setting values of parameters for each cell when optimizing each of the plural subareas in FIG. 8.

FIG. 8 is an illustration showing a procedure (S101 to S104) for dividing the service area 20A into plural subareas and optimizing the antenna parameters for each subarea in the communication system according to the present embodiment. Each of FIGS. 9A, 9B and 9C is an illustration showing an example of the number of candidates to be set as setting values of parameters for each cell when optimizing each of the plural subareas in FIG. 8. It is noted that, in FIG. 8, the descriptions of parts common to those in FIG. 6 described above are omitted.

In the present embodiment, rather than fixing the division manner of the subareas from the beginning, the area 20A is divided into plural subareas 20S(1) to 20S(3) so that the interdependence between the subareas is reduced. Further, when sequentially optimizing the antenna parameters of the target subarea, rather than fixing the setting values of the antenna parameters of the other subareas other than the main target subarea, the setting values of the antenna parameters are optimized by coarsening the adjustment granularity depending on the degree of contribution to the objective function.

In FIG. 8, when optimizing the setting values of the antenna parameters within a range of a predetermined number Nm (for example, 8) of candidates for the subarea 20S(1) including the cells 2 to 5 as the main target subarea (S101), the setting values of the antenna parameters of the remaining other subareas 20S(2) and 20S(3) are simultaneously optimized by increasing the adjustment granularity depending on the degree of contribution to the objective function (for example, UE communication quality in the entire area) (see FIG. 9A). For example, in the example of FIG. 9A, in the case that the adjustment granularity of the setting values of the antenna parameters of the main target subarea 20S(1) including the cells 2 to 5 is used as the standard (granularity 1 times), the setting values of the antenna parameters of the other subarea 20S(2) including the cells 6 to 9 are simultaneously optimized by increasing (roughening) the adjustment granularity to 8 times that of the main target subarea 20S(1), and the setting values of the antenna parameters of the other subarea 20S(3) including the cells 10 to 12 and 1 are simultaneously optimized by increasing (roughening) the adjustment granularity to 2 times that of the main target subarea 20S(1).

Similarly, when optimizing the setting values of the antenna parameters within a range of a predetermined number Nm (for example, 8) of candidates for the subarea 20S(2) including the cells 6 to 9 as the main target subarea (S102), the setting values of the antenna parameters of the remaining other subareas 20S(1) and 20S(3) are simultaneously optimized by increasing the adjustment granularity depending on the degree of contribution to the objective function (for example, UE communication quality in the entire area) (see FIG. 9B). For example, in the example of FIG. 9B, in the case that the adjustment granularity of the setting values of the antenna parameters of the main target subarea 20S(2) including the cells 6 to 9 is used as the standard (granularity 1 times), the setting values of the antenna parameters of the other subarea 20S(3) including the cells 10 to 12 and 1 are simultaneously optimized by increasing (roughening) the adjustment granularity to 2 times that of the main target subarea 20S(2), and the setting values of the antenna parameters of the other subarea 20S(1) including the cells 2 to 5 are simultaneously optimized by increasing (roughening) the adjustment granularity to 4 times that of the main target subarea 20S(2).

When optimizing the setting values of the antenna parameters within a range of a predetermined number Nm (for example, 8) of candidates for the subarea 20S(3) including the cells 10 to 12 and 1 as the main target subarea (S103), the setting values of the antenna parameters of the remaining other subareas 20S(1) and 20S(2) are simultaneously optimized by increasing the adjustment granularity depending on the degree of contribution to the objective function (for example, UE communication quality in the entire area) (see FIG. 9C). For example, in the example of FIG. 9C, in the case that the adjustment granularity of the setting values of the antenna parameters of the main target subarea 20S(3) including the cells 10 to 12 and 1 is used as the standard (granularity 1 times), the setting values of the antenna parameters of the other subarea 20S(1) including the cells 2 to 5 are simultaneously optimized by increasing (roughening) the adjustment granularity to 4 times that of the main target subarea 20S(3), and the setting values of the antenna parameters of the other subarea 20S(2) including the cells 6 to 9 are simultaneously optimized by increasing (roughening) the adjustment granularity to 8 times that of the main target subarea 20S(1).

It is noted that in the examples of FIGS. 8 and 9A to 9C, in the case that the adjustment granularity of the setting values of the antenna parameters are made higher (rougher) than in the main target subarea 20S(1), the case that the setting values of the antenna parameters are fixed is included.

Figure 10:
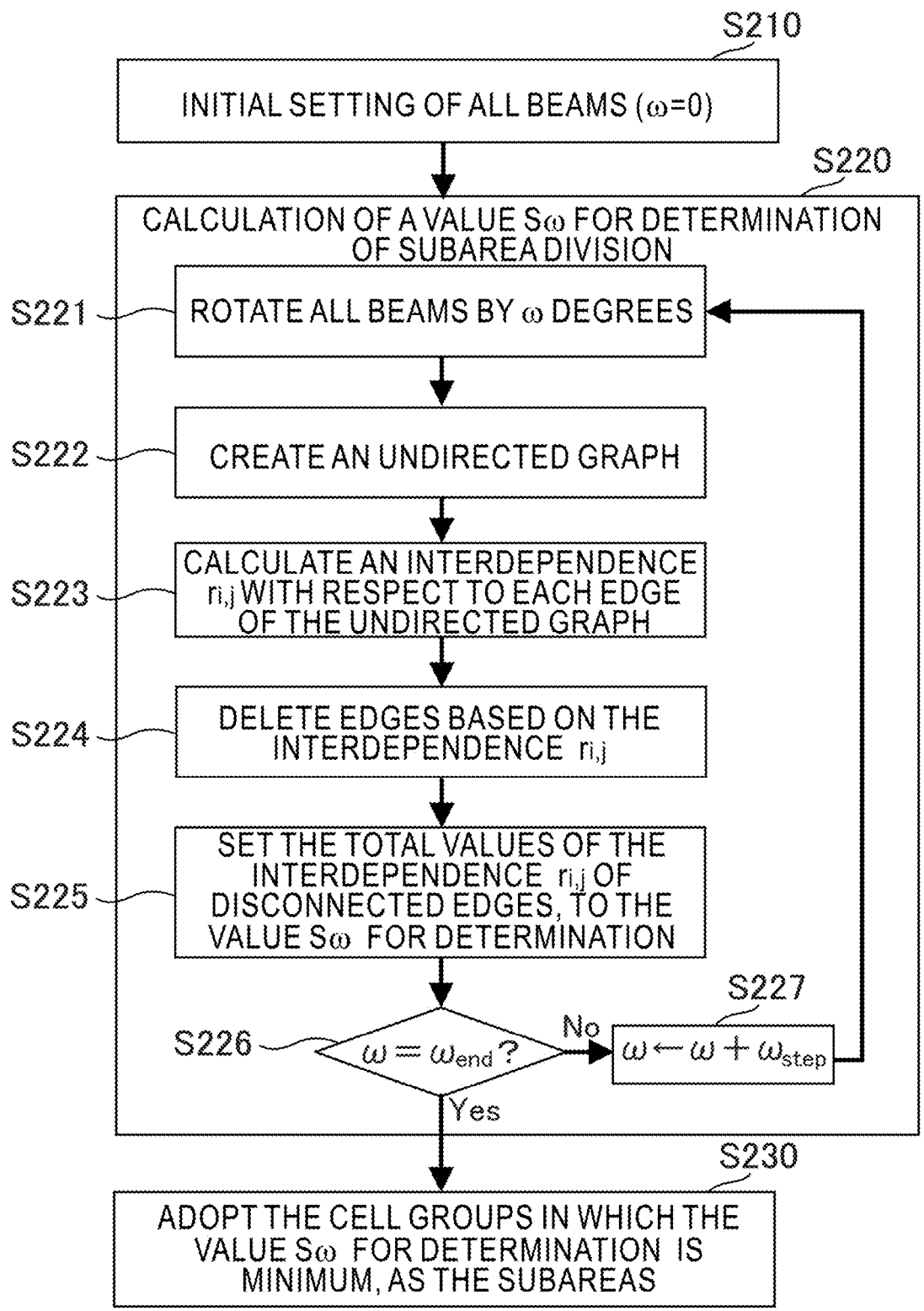
FIG. 10 is a flowchart showing an example of an area division procedure for dividing a service area into plural subareas according to the embodiment.
Figure 11:
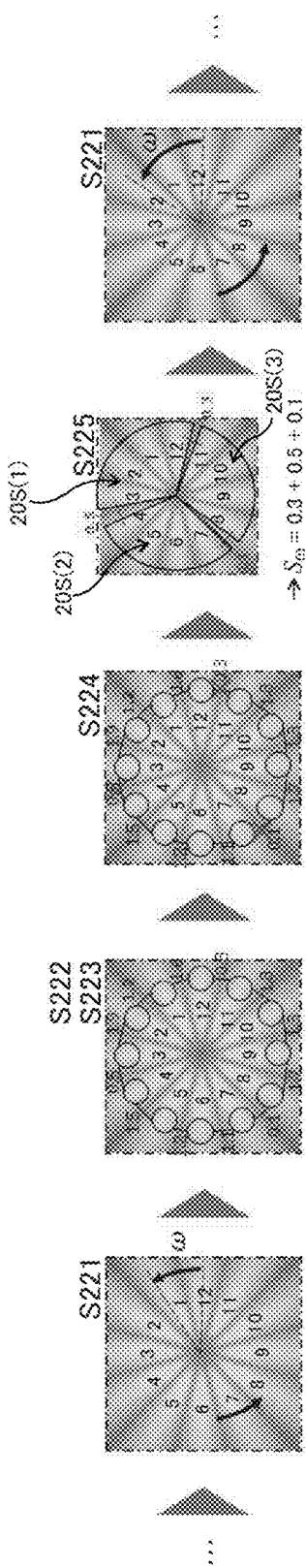
FIG. 11 is an illustration showing the area division procedure in FIG. 10.

FIG. 10 is a flowchart showing an example of an area division procedure for dividing a service area into plural subareas according to the present embodiment. FIG. 11 is an illustration showing the area division procedure in FIG. 10. In FIG. 10, the area division procedure includes an initial setting step for the entire beams (S210), a calculation step for a value for determination $S_\omega$ of the subarea division (S220), and a determination step for the division subareas (S230).

In the initial setting step for the entire beams (S210), the entire plural beams forming plural cells in the entire area are initialized to an initial state, and the rotation angle ω of the entire beams in the initial state is set to 0 degrees (S210).

Next, in the calculation step for the value for determination $S_\omega$ of the subarea division (S220), first, the entire beams are rotated by a predetermined angle $\omega_{step}$ degree (S221) (see FIG. 11).

Next, an undirected graph with each cell as a vertex and connections with potentially adjacent cells as edges is created (S222), and the interdependence $r_{i,j}$ of the two cells that are vertices for each edge is calculated (S223) (see FIG. 11). The interdependence $r_{i,j}$ is defined by the following equation (1). However, d ($\Delta C_i$, $\Delta C_j$) in the equation (1) is the amount of improvement in the objective function when the beam directions of the cells i and j are slightly changed.

$$r_{i,j} = \frac{\left(\begin{array}{c}\text{Maximum value of the amount of improvement when}\\ \text{slightly changing the adjacent cells at a same time}\end{array}\right)}{\left(\begin{array}{c}\text{Maximum value of the amount of improvement when}\\ \text{slightly changing the adjacent cells individually}\end{array}\right)} \quad (1)$$

$$= \frac{\max(d(\Delta c_i, \Delta c_j), d(-\Delta c_i, \Delta c_j), d(\Delta c_i, -\Delta c_j), d(-\Delta c_i, -\Delta c_j))}{\max\left(\begin{array}{c}d(\Delta c_i) + d(\Delta c_j), d(-\Delta c_i) + d(\Delta c_j), d(c_i) +\\ d(-\Delta c_j), d(-\Delta c_i) + d(-\Delta c_j)\end{array}\right)}$$

Next, the edges are deleted in order from the one with the lowest interdependence $r_{i,j}$, the edge deletion is finished when the number of cell groups disconnected from their surroundings reaches three (S224), and the total value of the interdependencies $r_{i,j}$ of the disconnected edges is set to the value for determination $S_\omega$ (S225) (see FIG. 11).

Next, until the rotation angle ω of the entire beams reaches a predetermined end angle $\omega_{end}$ (No in S226), the next ω is set with $\omega + \omega_{step}$ (S227), and the process is repeated from the rotation of the entire beams (S221) to the setting of the value for determination $S_\omega$.

When the rotation angle ω of the entire beams reaches the predetermined end angle $\omega_{end}$ (Yes in S226), the process is completed from the rotation of the entire beams (S221) to the setting of the value for determination $S_\omega$.

In the determination step of the division subarea (S230), cell groups at ω where the plural values for determination $S_\omega$ are the lowest ($S_\omega$=0.9=0.3+0.5+0.1 in the example of FIG. 11) are determined and adopted as the plural subareas.

Figure 12A:
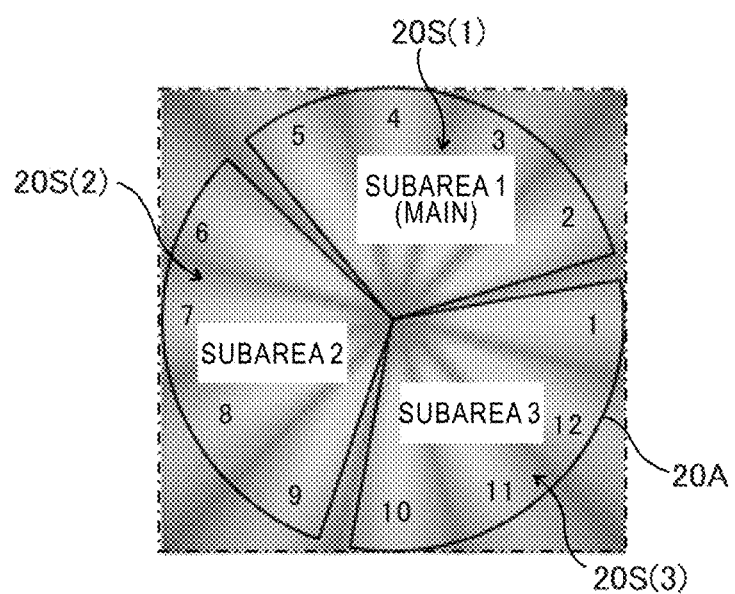
FIG. 12A is an illustration showing an example of a procedure for determining an adjustment granularity of antenna parameters in plural subareas into which a service area is divided, according to the embodiment.
Figure 12B:
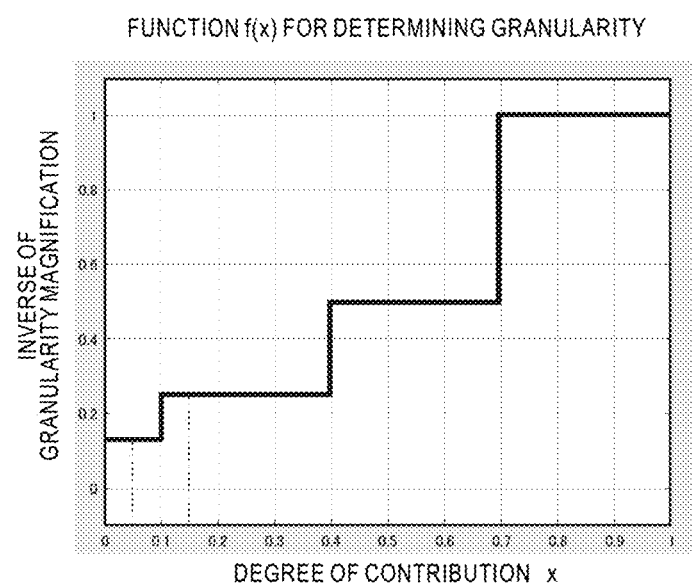
FIG. 12B is an illustration showing an example of a procedure for determining an adjustment granularity of antenna parameters in plural subareas into which a service area is divided, according to the embodiment.
Figure 12C:
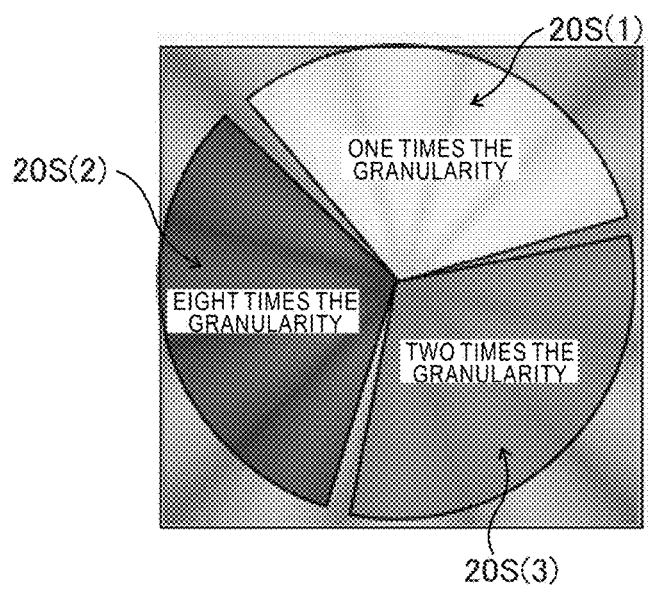
FIG. 12C is an illustration showing an example of a procedure for determining an adjustment granularity of antenna parameters in plural subareas into which a service area is divided, according to the embodiment.

FIGS. 12A to 12C are illustrations showing an example of a procedure for determining the adjustment granularity of antenna parameters in the plural subareas 20S(1) to 20S(3) into which the service area 20A is divided according to the present embodiment.

In FIG. 12A, for example, the granularity of the main subarea (main target subarea) 20S(1) including the cells 2 to 5 is kept as is (1 times).

Next, regarding the other subareas 20S(2) and 20S(3) other than the main subarea (main target subarea) 20S(1), the ratio of the number of users (number of UEs) in each subarea i to the total number of users (number of UEs) is calculated as the degree of contribution $x_i$ (see Table 1).

TABLE 1

|  | Subarea 2 | Subarea 3 |
|---|---|---|
| The umber of UEs (The number of users) | 150 | 450 |
| The number of UEs (The number of users) | 0.05 | 0.15 |

Next, the granularity (times) in each of the other subareas 20S(2) and 20S(3) is determined based on the degree of contribution $x_i$ calculated for the other subareas 20S(2) and 20S(3) and a predetermined function f(x) for determining the granularity exemplified in FIG. 12B (see FIG. 12C, Table 2).

TABLE 2

|  | Subarea 2 | Subarea 3 |
|---|---|---|
| Degree of contribution $x_i$ | 0.05 | 0.15 |
| Multiples of granularity | 4 | 2 |

The foregoing procedure of the granularity determination is executed each time when changing the main subarea (main target subarea) that is the optimization target of the antenna parameters.

Figure 13:
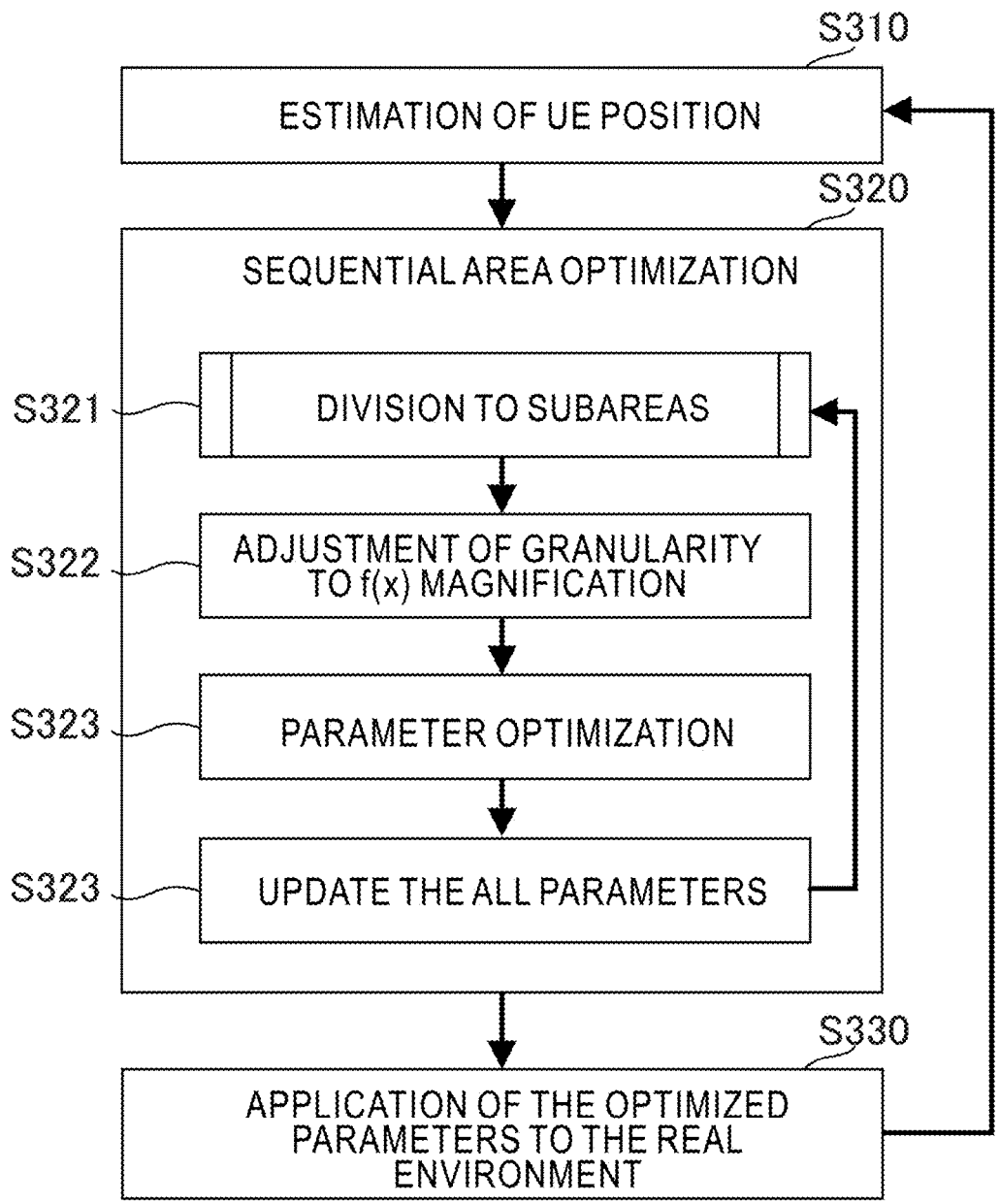
FIG. 13 is a flowchart showing an example of a dynamic area control according to the embodiment.

FIG. 13 is a flowchart showing an example of a dynamic area control in the HAPS 20 according to the embodiment. In FIG. 13, the dynamic area control includes a UE-position estimation step (S310), a sequential-area optimization step (S320) and a parameter application step (S330) for applying the optimization parameters to the real environment.

In the UE-position estimation step (S310), the position of each UE 61 in the area 20A is estimated by some method, and the estimation result (for example, coordinate data of the position of each UE 61) is outputted. The position of each UE 61 can be estimated using, for example, GNSS position information or MR (measurement report) fed back from each UE 61.

Next, in the sequential-area optimization step (S320), the estimation result of the position of each UE 61 (for example, coordinate data of the position of each UE 61) outputted in the UE-position estimation step (S310) is inputted, and the optimal value of the antenna parameter of each cell optimized for each subarea is outputted. For example, the area 20A of N cells is divided into M subareas, and each subarea is optimized in turn using the following procedure.

First, the area 20A is divided into plural (M) subareas 20S(i) (i=1 to M) so that the interdependence between the subareas is reduced by, for example, the procedure described above (S321).

Next, the granularity of each of the subarea 20S(i) is set to $f(x_i)$ depending on the degree of contribution $x_i$ to the objective function by, for example, the procedure described above (S322).

Next, the aforementioned total of 4(N/M)+M−1 kinds of the antenna parameters are optimized using a genetic algorithm or the like, based on the determined setting of $f(x_i)$ of granularity (S323).

Next, the values of the antenna parameters for the entire area 20A are updated with the values of the optimized parameters (S323).

It is noted that the processes of S321 to S323 for all subareas 20S(i) may be repeated T times (T≥1).

In the parameter application step (S330), the updated final value of the antenna parameters of each cell in the area 20A after completing the sequential-area optimization step (S320) is applied as the control setting value of the SL antenna 211 in the communication relay station in the real environment.

It is noted that the dynamic area control exemplified in FIG. 13 may be executed periodically (for example, periodic timing every hour or every two hours), or may be executed every time there is a large change in the UE distribution in the area 20A (for example, at a timing when the amount of change in the number of UEs in a predetermined monitoring area exceeds a predetermined threshold value).

It is noted that the number and method of dividing the service area 20A in the dynamic area control may be determined by considering the number, size, shape, etc. of the cells included in the service area 20A.

As described above, according to the present embodiment, it is possible to perform the dynamic area control capable of responding to the changes in the distribution of UEs 61 in the service area 20A configured with plural cells formed toward the ground, and to suppress an increase in the time required for the area optimization in the dynamic area control.

In particular, according to the present embodiment, it is possible to appropriately perform the division of subareas used for the area optimization in the dynamic area control and the granularity setting adjustment of the antenna parameters in each subarea depending on the status of the service area.

Since the present invention is capable of constructing a new communication platform for use in large-scale disasters, etc. which can provide ultra-wide-area mobile communication services from the stratosphere at an altitude of about 20 km to terminal apparatuses on the ground, it is possible to contribute to achieving Goal 9 of the Sustainable Development Goals (SDGs), "Create a foundation for industry and technological innovation".

It is noted that, the process steps and configuration elements of the relay communication station of communication relay apparatus such as HAPS, etc., feeder station, gateway station, remote control apparatus, server, terminal apparatus (user equipment, mobile station, communication terminal), base station and base station apparatus described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, radio relay station, feeder station, gateway station, base station, base station apparatus, radio-relay station apparatus, terminal apparatus (user equipment, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented in the computer or processor, or outside the processor. Further, the firmware and/or software code may be stored in, for example, a medium capable being read by a computer or processor, such as a random-access memory (RAM), a read-only memory (ROM), a non-volatile random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

20: HAPS (communication relay apparatus)
20A: service area
20C: cell
20F: foot print
20S: subarea
21: relay communication station
60: UE-high density section
61: UE (terminal equipment)
70: GW station
80: base station apparatus
90: mobile communication network
95: remote control apparatus
211: antenna for service link (SL antenna)
212: antenna for feeder link (FL antenna)

The invention claimed is:

1. A communication relay apparatus of aerial-staying type having a relay communication station and an antenna for service link for relaying radio communications of terminal apparatuses positioned in plural (N) cells formed toward a service area on a ground, the communication relay apparatus comprising:
position estimation means for estimating positions of plural terminal apparatuses positioned in the service area;
parameter optimization means for dividing the service area into plural (M) subareas including plural cells, and optimizing plural (L) kinds of antenna parameters of the antenna for service link for each of the subareas, based on an estimation result of the positions of the plural terminal apparatuses; and
parameter application means for applying, to the antenna for service link, optimal values of the plural (L) kinds of antenna parameters after completing the optimization of each subarea for all of the plural (M) subareas,
wherein the parameter optimization means divides the service area into the plural subareas so that an interdependence between the subareas is reduced and
wherein the parameter optimization means optimizes the antenna parameters for other subareas other than a main target subarea at a coarser granularity than for the main target subarea, when optimizing the antenna parameters for any one of the plural subareas as the main target subarea.

2. The communication relay apparatus according to claim 1,
wherein the parameter optimization means:
sets plural groups respectively configured with plural subarea candidates by rotating the entire plural beams forming the plural cells by a predetermined angle;
calculates, for each of the plural groups, an index value of interdependence between the subarea candidates; and
determines, as the plural subareas for optimizing the antenna parameters, plural subarea candidates of the group in which total values of the index values of interdependence between the subarea candidates among the plural groups is minimized.

3. The communication relay apparatus according to claim 1,
wherein the parameter optimization means repeatedly performs the parameter optimization for each subarea plural times (T times).

4. The communication relay apparatus according to claim 1,
wherein the communication relay apparatus performs the position estimation of the plural terminal apparatuses, the optimization of the antenna parameters and the application of the optimal values of the antenna parameters to the antenna for service link, periodically or when an amount of change in distribution of the terminal apparatuses in the service area becomes larger than a predetermined amount of change.

5. A communication relay apparatus of aerial-staying type having a relay communication station and an antenna for service link for relaying radio communication of terminal apparatuses positioned in plural (N) cells formed toward a service area on a ground, the communication relay apparatus comprising:
position estimation means for estimating positions of plural terminal apparatuses positioned in the service area;
parameter optimization means for dividing the service area into plural (M) subareas including plural cells, and optimizing plural (L) kinds of antenna parameters of the antenna for service link for each of the subareas, based on an estimation result of the positions of the plural terminal apparatuses; and
parameter application means for applying, to the antenna for service link, optimal values of the plural (L) kinds of antenna parameters after completing the optimization of each subarea for all of the plural (M) subareas, and
wherein, when performing the optimization of the antenna parameters with any one of the plural subareas as a main target subarea, the parameter optimization means optimizes the antenna parameters for other subareas other than a main target subarea at a coarser granularity than for the main target subarea, when optimizing the antenna parameters for any one of the plural subareas as the main target subarea.

6. The communication relay apparatus according to claim 5,
wherein, with respect to the other subareas other than the main target subarea, the parameter optimization means determines the granularity when optimizing the antenna parameters, depending on a degree of contribution to an objective function for the entire service area.

7. The communication relay apparatus according to claim 6,
wherein the objective function is a communication quality of the entire service area, and
wherein the degree of contribution to the objective function is a ratio of a number of terminal apparatuses in the other subareas to a number of terminal apparatuses in the entire service area.

8. The communication relay apparatus according to claim 5,
wherein the parameter optimization means repeatedly performs the parameter optimization for each subarea plural times (T times).

9. The communication relay apparatus according to claim 5,
wherein the communication relay apparatus performs the position estimation of the plural terminal apparatuses, the optimization of the antenna parameters and the application of the optimal values of the antenna parameters to the antenna for service link, periodically or when an amount of change in distribution of the terminal apparatuses in the service area becomes larger than a predetermined amount of change.

10. A remote control apparatus capable of communicating with a communication relay apparatus of aerial-staying type that has a relay communication station and an antenna for service link for relaying radio communications of terminal apparatuses positioned in plural (N) cells formed toward a service area on a ground, the remote control apparatus comprising:
 position estimation means for estimating positions of plural terminal apparatuses positioned in the service area;
 parameter optimization means for dividing the service area into plural (M) subareas including plural cells, and optimizing plural (L) kinds of antenna parameters of the antenna for service link for each of the subareas, based on an estimation result of the positions of the plural terminal apparatuses; and
 parameter transmission means for transmitting, to the communication relay apparatus, optimal values of the plural (L) kinds of antenna parameters after completing the optimization of each subarea for all of the plural (M) of subareas,
 wherein the parameter optimization means divides the service area into the plural subareas so that an interdependence between the subareas is reduced and
 wherein the parameter optimization means optimizes the antenna parameters for other subareas other than a main target subarea at a coarser granularity than for the main target subarea, when optimizing the antenna parameters for any one of the plural subareas as the main target subarea.

11. A system, comprising the remote control apparatus according to claim 10 and the communication relay apparatus of aerial-staying type.

12. A remote control apparatus capable of communicating with a communication relay apparatus of aerial-staying type that has a relay communication station and an antenna for service link for relaying radio communications of terminal apparatuses positioned in plural (N) cells formed toward a service area on a ground, the remote control apparatus comprising:
 position estimation means for estimating positions of plural terminal apparatuses positioned in the service area;
 parameter optimization means for dividing the service area into plural (M) subareas including plural cells, and optimizing plural (L) kinds of antenna parameters of the antenna for service link for each of the subareas, based on an estimation result of the positions of the plural terminal apparatuses; and
 parameter transmission means for transmitting, to the communication relay apparatus, optimal values of the plural (L) kinds of antenna parameters after completing the optimization of each subarea for all of the plural (M) subareas, and
 wherein the parameter optimization means optimizes the antenna parameters for other subareas other than a main target subarea at a coarser granularity than for the main target subarea, when optimizing the antenna parameters for any one of the plural subareas as the main target subarea.

13. A system, comprising the remote control apparatus according to claim 12 and the communication relay apparatus of aerial-staying type.

14. An area control method for a service area configured with plural (N) of cells formed from a communication relay apparatus of aerial-staying type toward a ground, the area control method comprising:
 estimating positions of plural terminal apparatuses positioned in the service area;
 dividing the service area into plural (M) subareas including plural cells, and optimizing plural (L) kinds of antenna parameters of an antenna for service link for each of the subareas, based on an estimation result of the positions of the plural terminal apparatuses;
 applying, to the antenna for service link, optimal values of the plural (L) kinds of antenna parameters after completing the optimization of each subarea for all of the plural (M) subareas;
 dividing the service area into the plural subareas so that an interdependence between the subareas is reduced; and
 optimizing the antenna parameters for other subareas other than a main target subarea at a coarser granularity than for the main target subarea, when optimizing the antenna parameters for any one of the plural subareas as the main target subarea.

15. An area control method for a service area configured with plural (N) cells formed from a communication relay apparatus of aerial-staying type toward a ground, comprising:
 estimating positions of plural terminal apparatuses positioned in the service area;
 dividing the service area into plural (M) subareas including plural cells, and optimizing plural (L) kinds of antenna parameters of an antenna for service link for each of the subareas, based on an estimation result of the positions of the plural terminal apparatuses;
 applying, to the antenna for service link, optimal values of the plural (L) kinds of antenna parameters after completing the optimization of each subarea for all of the plural (M) subareas; and
 optimizing the antenna parameters for other subareas other than a main target subarea at a coarser granularity than for the main target subarea, when optimizing the antenna parameters for any one of the plural subareas as the main target subarea.

16. A non-transitory computer readable medium containing software that is executed by a computer or processor provided in a communication relay apparatus of aerial-staying type that has a relay communication station and an antenna for service link for relaying radio communications of terminal apparatuses positioned in plural (N) cells formed toward a service area on a ground, the software comprising:
 executable code that estimates positions of plural terminal apparatuses positioned in the service area;
 executable code that divides the service area into plural (M) subareas including plural cells, and optimizes plural (L) kinds of antenna parameters of the antenna for service link for each of the subareas, based on an estimation result of the positions of the plural terminal apparatuses;
 executable code that applies, to the antenna for service link, optimal values of the plural (L) kinds of antenna parameters after completing the optimization of each subarea for all of the plural (M) subareas;
 executable code that divides the service area into the plural subareas so that an interdependence between the subareas is reduced; and
 executable code that optimizes the antenna parameters for other subareas other than a main target subarea at a coarser granularity than for the main target subarea, when optimizing the antenna parameters for any one of the plural subareas as the main target subarea.

17. A non-transitory computer readable medium containing software that is executed by a computer or processor provided in a communication relay apparatus of aerial-staying type that has a relay communication station and an antenna for service link for relaying radio communications of terminal apparatuses positioned in plural (N) cells formed toward a service area on a ground, the software comprising:

executable code that estimates positions of plural terminal apparatuses positioned in the service area;

executable code that divides the service area into plural (M) subareas including plural cells, and optimizes plural (L) kinds of antenna parameters of the antenna for service link for each of the subareas, based on an estimation result of the positions of the plural terminal apparatuses;

executable code that applies, to the antenna for service link, optimal values of the plural (L) kinds of antenna parameters after completing the optimization of each subarea for all of the plural (M) subareas; and executable code that optimizes the antenna parameters for other subareas other than a main target subarea at a coarser granularity than for the main target subarea, when optimizing the antenna parameters for any one of the plural subareas as the main target subarea.

18. A non-transitory computer readable medium containing software executed by a computer or processor provided in a remote control apparatus capable of communicating with a communication relay apparatus of aerial-staying type that has a relay communication station and an antenna for service link for relaying radio communications of terminal apparatuses positioned in plural (N) cells formed toward a service area on a ground, the software comprising:

executable code that estimates positions of plural terminal apparatuses positioned in the service area;

executable code that divides the service area into plural (M) subareas including plural cells, and optimizes plural (L) kinds of antenna parameters of the antenna for service link for each of the subareas, based on an estimation result of the positions of the plural terminal apparatuses;

executable code that transmits, to the communication relay apparatus, optimal values of the plural (L) kinds of antenna parameters after completing the optimization of each subarea for all of the plural (M) subareas;

executable code that divides the service area into the plural subareas so that an interdependence between the subareas is reduced; and executable code that optimizes the antenna parameters for other subareas other than a main target subarea at a coarser granularity than for the main target subarea, when optimizing the antenna parameters for any one of the plural subareas as the main target subarea.

19. A non-transitory computer readable medium containing software that is executed by a computer or processor provided in a remote control apparatus capable of communicating with a communication relay apparatus of aerial-staying type that has a relay communication station and an antenna for service link for relaying radio communications of terminal apparatuses positioned in plural (N) cells formed toward a service area on a ground, the software comprising:

executable code that estimates positions of plural terminal apparatuses positioned in the service area;

executable code that divides the service area into plural (M) subareas including plural cells, and optimizes plural (L) kinds of antenna parameters of the antenna for service link for each of the subareas, based on an estimation result of the positions of the plural terminal apparatuses;

executable code that transmits, to the communication relay apparatus, optimal values of the plural (L) kinds of antenna parameters after completing the optimization of each subarea for all of the plural (M) subareas; and executable code that optimizes the antenna parameters for other subareas other than a main target subarea at a coarser granularity than for the main target subarea, when optimizing the antenna parameters for any one of the plural subareas as the main target subarea.

* * * * *